United States Patent
Steinkellner

(10) Patent No.: US 11,738,680 B2
(45) Date of Patent: Aug. 29, 2023

(54) LIGHTING DEVICE FOR A MOTOR VEHICLE HEADLIGHT

(71) Applicant: ZKW Group GmbH, Wieselburg (AT)

(72) Inventor: Johann Steinkellner, St. Oswald (AT)

(73) Assignee: ZKW Group GmbH, Wieselburg (AT)

(*) Notice: Subject to any disclaimer, the term of this patent is extended or adjusted under 35 U.S.C. 154(b) by 0 days.

(21) Appl. No.: 17/642,737

(22) PCT Filed: Aug. 10, 2020

(86) PCT No.: PCT/EP2020/072376
§ 371 (c)(1),
(2) Date: Mar. 14, 2022

(87) PCT Pub. No.: WO2021/052679
PCT Pub. Date: Mar. 25, 2021

(65) Prior Publication Data
US 2022/0324375 A1   Oct. 13, 2022

(30) Foreign Application Priority Data
Sep. 20, 2019  (EP) ..................... 19198689

(51) Int. Cl.
*B60Q 1/068* (2006.01)
*F21S 41/29* (2018.01)
*F21S 45/47* (2018.01)

(52) U.S. Cl.
CPC ............ *B60Q 1/0683* (2013.01); *F21S 41/29* (2018.01); *F21S 45/47* (2018.01); *B60Q 2200/32* (2013.01)

(58) Field of Classification Search
CPC .................. B60Q 1/0683; B60Q 2200/32; B60Q 1/0408; B60Q 1/0433; B60Q 1/0441;
(Continued)

(56) References Cited

U.S. PATENT DOCUMENTS 5,762,415 A * 6/1998 Tolley .................. B60Q 1/0683
362/421
2009/0207626 A1   8/2009 Kim
(Continued)

FOREIGN PATENT DOCUMENTS

EP   3299642 B1   10/2019
FR   3055265 A1    3/2018
FR   3056701 B1    3/2018

OTHER PUBLICATIONS

International Search Report for PCT/EP2020/072376, dated Oct. 8, 2020 (11 pages).
(Continued)

*Primary Examiner* — Omar Rojas Cadima
(74) *Attorney, Agent, or Firm* — Eversheds Sutherland (US) LLP

(57) ABSTRACT

An illumination device for a motor vehicle headlight, which illumination device (10) comprises:
a light module (100) comprising:
at least one light source (110), a primary optics (200), a heat sink (300), and
a holding body (400) set up to hold the primary optics (200) in their position, the holding body (400) and the heat sink (300) being connected to one another by means of a fastening means (500),
and a support frame (700) on which the light module (100) is fastened via an adjustment screw (800) which comprises a screw head (810) and a screw section along a longitudinal axis (A), which screw head (810) is mounted in an articulated manner on the light module (100), the light module (100) comprising a bearing device (900), which bearing device (900) comprises a first and a second bearing shell (910, 920) which together form a joint socket, the first bearing shell (910) being arranged on the holding body (400) and the
(Continued)

Figure 3:
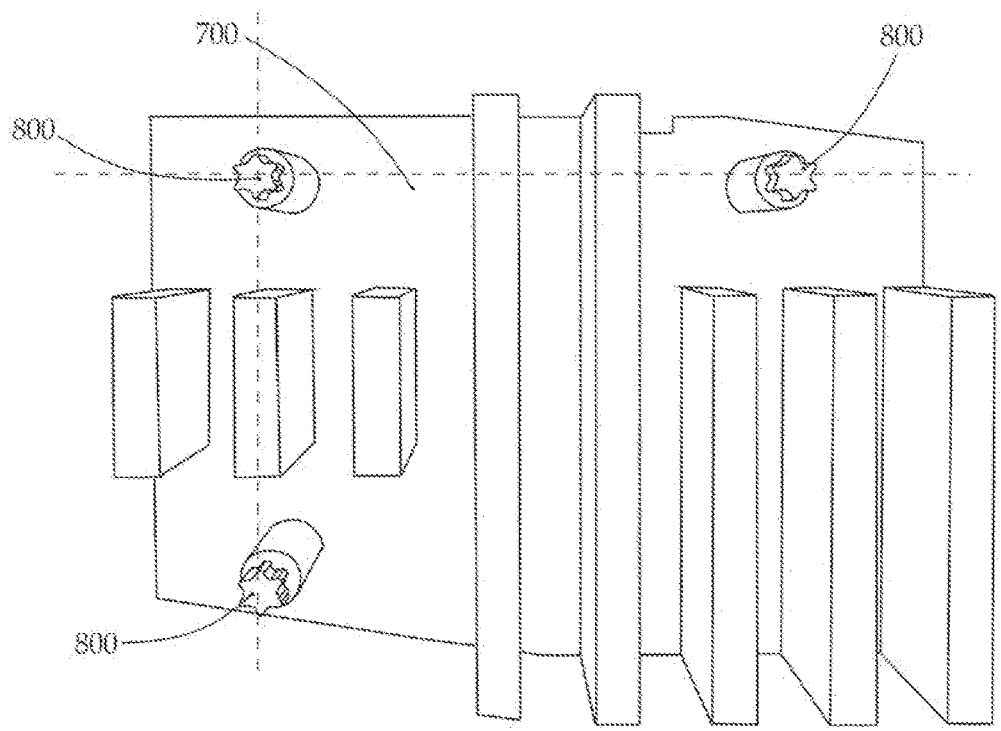

second bearing shell (920) being arranged on the heat sink (300), and the bearing device (900) being set up to support the screw head (810), and the joint socket enclosing the screw head (810) such that the at least one adjustment screw (800) is secured against displacement in the direction of its longitudinal axis (A).

9 Claims, 2 Drawing Sheets

(58) Field of Classification Search
CPC ....... B60Q 1/076; B60Q 1/2634; F21S 41/29; F21S 41/19; F21S 45/47; F21W 2102/13; F21V 17/12
See application file for complete search history.

(56) References Cited

U.S. PATENT DOCUMENTS

2017/0043706 A1* 2/2017 Shibata ................ B60Q 1/0433
2018/0142854 A1* 5/2018 Nakao .................... F21S 41/24

OTHER PUBLICATIONS

Search Report for European Patent Application No. 19198689.2 dated Mar. 16, 2020 (8 pages).

* cited by examiner

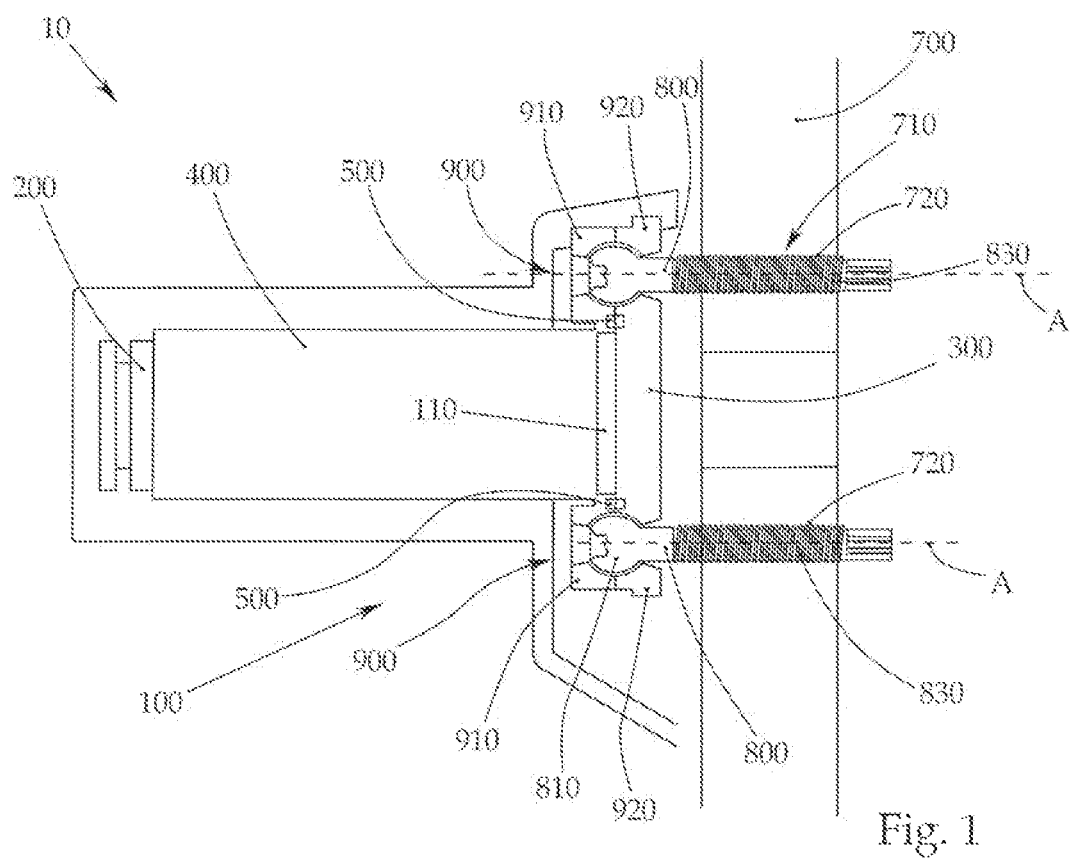
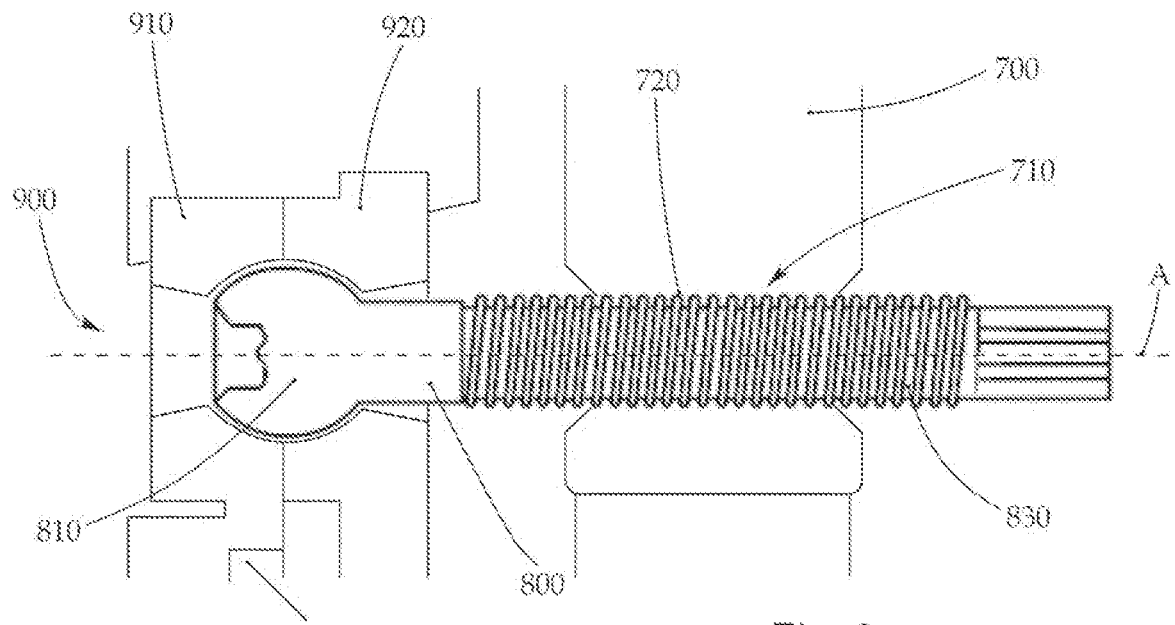

LIGHTING DEVICE FOR A MOTOR VEHICLE HEADLIGHT

The invention relates to an illumination device for a motor vehicle headlight, which illumination device comprises the following:
a light module comprising:
at least one light source,
a primary optics for shaping a light distribution from the light of the at least one light source,
a heat sink in thermal contact with the at least one light source and set up to dissipate heat from the at least one light source, and
a holding body set up to hold the primary optics in their position in relation to the at least one light source, the holding body and the heat sink being connected to one another by means of at least one fastening means,
and a support frame to which the light module is fastened via at least one adjustment screw, the adjustment screw comprising a screw head and a screw section along a longitudinal axis, which screw head is mounted in an articulated manner on the light module and which screw section acts on the support frame.

Furthermore, the invention relates to a motor vehicle headlight having at least one illumination device according to the invention.

One or more light modules mounted alone or together on a support frame can usually be provided, which support frame is then installed in a motor vehicle headlight.

In order to mechanically connect the light modules to the support frame, it is known from the prior art for the light modules to be mounted by means of screws screwed into the heat sink of the illumination device via the support frame.

However, this requires additional components, for example, which serve as an interface between the light module and the adjustment screw, the manufacture of said components and the corresponding bearing point to be produced on the light module being subject to manufacturing tolerances. Furthermore, a complex fastening mechanism must be designed and manufactured for each bearing point and the corresponding component, since motor vehicle headlights in a vehicle are subject to vibrations during operation, which can lead to screws that are not firmly mounted being able to loosen again.

It is an object of the invention to provide an improved illumination device.

This object is achieved in that the light module comprises at least one bearing device for the articulated mounting of the screw head of the at least one adjustment screw, which bearing device comprises a first and a second bearing shell, the first and the second bearing shell jointly forming a joint socket by bringing the two bearing shells together, the first bearing shell being arranged on the holding body and the second bearing shell being arranged on the heat sink, and the bearing device being set up to bear the screw head of the at least one adjustment screw, and the joint socket enclosing the screw head of the at least one adjustment screw such that the at least one adjustment screw is secured against displacement in the direction of its longitudinal axis.

As a result of the solution, additional components for fastening and using the adjustment screws, as in the prior art, are avoided, which also results in a reduction in costs.

The coordination effort between the mentioned components from the prior art is also avoided.

It can advantageously be provided that the at least one adjustment screw has a threaded section and the support frame comprises at least one counter-threaded element, which at least one counter-threaded element has a counter-thread that corresponds to the thread of the at least one adjustment screw.

It can be provided that the adjustment screws are designed to be self-tapping and the counter-thread is created when the adjustment screw is screwed into the support frame for the first time.

Advantageously, the light module can comprise at least two bearing devices, the illumination device having a number of corresponding adjustment screws corresponding to the number of bearing devices.

It can be provided that the light module comprises exactly three bearing devices, the illumination device comprising at least three adjustment screws corresponding to the corresponding bearing devices.

It can be further provided that the counter-threaded elements of the support frame that correspond to the adjustment screws are arranged on the support frame such that imaginary connecting lines among the counter-threaded elements form a right-angled triangle, preferably an isosceles right-angled triangle.

When the illumination device is installed in a motor vehicle headlight, which is properly installed in a motor vehicle, the imaginary connecting lines correspond, for example, to a horizontal and a vertical pivot axis. Such an arrangement of the counter-threaded elements on the support frame together with the adjustment screws and the corresponding bearing devices of the light module can also be referred to as an adjustment triangle system.

In connection with the present invention, the term "adjustment triangle system" is generally understood to mean an adjustment system which adjusts the light module with respect to the support frame via three adjustment elements (for example, adjustment screws) which are connected at least rotatably to the corresponding light module and to the support frame. In this case, the adjustment normally takes place by means of mechanical and/or electromotive adjusting means which are associated with the illumination device.

It can be provided that at least one adjustment screw is arranged in a slot in the support frame. It can also be provided that at least two, preferably exactly two, adjustment screws are each arranged in a slot in the support frame, for example, one adjustment screw is arranged in a horizontal slot and another adjustment screw is arranged in a vertical slot.

The terms "vertical" and "horizontal" here refer to an illumination device installed in a motor vehicle headlight, the motor vehicle headlight being properly installed in a motor vehicle.

It can be advantageous if the longitudinal axes of the adjustment screws are arranged parallel to one another on the support frame when the adjustment screws are at least partially screwed in.

In an expedient embodiment, it can be provided that the first bearing shell of the at least one bearing device is produced in one piece with the holding body.

In a second expedient embodiment, it can be provided that the second bearing shell of the at least one bearing device is produced in one piece with the heat sink.

It can be favorable if the screw head of the at least one adjustment screw is mounted in the at least one bearing device such that it can rotate about the longitudinal axis of the adjustment screw.

It can be provided that the screw head of the at least one adjustment screw is designed as a joint head or as a ball head.

As a result, the at least one adjustment screw together with the at least one bearing device forms a ball joint, wherein, in principle, three-axis rotations of the adjustment screw are possible (at least to a certain extent), but translational movements along the longitudinal axis of the adjustment screw are not possible.

The object is also achieved with a motor vehicle headlight having at least one illumination device according to the invention.

The invention is explained in more detail below with reference to exemplary drawings. Shown here FIG. 1 a side view of an exemplary illumination device having a light module fastened to a support frame by means of adjustment screws, wherein the adjustment screws are each mounted in an articulated and rotatable manner in a bearing device of the light module, FIG. 2 a detailed view of an adjustment screw mounted in a bearing device, FIG. 3 a rear view of the exemplary illumination device from FIG. 1, and FIG. 4 a rear view of a further exemplary illumination device.

FIG. 1 shows an exemplary illumination device 10 for a motor vehicle headlight, which illumination device 10 comprises a light module 100 and a support frame 700, on which the light module 100 is fastened by means of adjustment screws 800, wherein each adjustment screw 800 comprises a screw head 810 designed as a spherical head, and a longitudinal axis A, and wherein the screw head 810 is mounted in an articulated manner on the light module.

The light module 100 itself comprises a light source 110, a primary optics 200 for shaping a light distribution from the light from the light source 110, a heat sink 300 in thermal contact with the at least one light source 110 and being set up to dissipate heat from the light source 110, and a holding body 400 set up to hold the primary optics 200 in their position in relation to the at least one light source 110, wherein the holding body 400 and the heat sink 300 are connected to each other by means of two fastening means 500, wherein the fastening means 500 can be, for example, screws or something similar.

Furthermore, the light module 100 comprises three bearing devices 900 (only two bearing devices can be seen in FIG. 1 due to the selected side view), which bearing devices 900 each comprise a first and a second bearing shell 910, 920, wherein the first and the second bearing shell 910, 920 together form a joint socket. The bearing devices 900 are each set up to support the screw head 810 of the adjustment screws 800, wherein the joint socket of the adjustment screws 800 encloses the screw head 810, so that the adjustment screw 800 is secured against displacement in the direction of its longitudinal axis A, the screw head 810 or the adjustment screw 800 being rotatably mounted about its longitudinal axis A. In other words, the adjustment screw 800 and the corresponding bearing device 900 form a so-called ball joint. A detailed view of the engagement between the bearing device 900 and the adjustment screw 800 is shown in FIG. 2. Three-axis rotations of the adjustment screw 800 are possible in principle, but translational movements, as already mentioned, are not possible.

In this case, the first bearing shell 910 is arranged on the holding body 400 and is produced in one piece therewith. The second bearing shell 920 is arranged on the heat sink 300 and is also produced in one piece therewith.

As already mentioned, the light module 100 is fastened to the support frame 700 by means of the adjustment screws 800, wherein the adjustment screws 800 have a threaded section 820 having a thread 830 for this purpose and the support frame has corresponding counter-threaded elements 710, which counter-threaded elements 710 each have a counter-thread 720 corresponding to the thread of the adjustment screws 800.

The adjustment screws 800 can be used to adjust the orientation of the light module 100 in relation to the support frame 700. For this purpose, the adjustment screws 800 and the corresponding counter-threaded elements 710 of the support frame 700 are arranged on the support frame 700 such that imaginary connecting lines among the counter-threaded elements 710 form a right-angled triangle, preferably an isosceles right-angled triangle, wherein the adjustment screws 800 are at least partially screwed into the corresponding counter-threaded elements 710 such that the adjustment screws 800 are arranged parallel to each other on the support frame 700. For this purpose, FIG. 3 shows a rear view of the exemplary illumination device 10, wherein the imaginary connecting lines mentioned above are drawn in dashed lines among the adjustment screws 800.

Such an arrangement of the adjustment screws 800 or the counter-threaded elements 710 can also be referred to as an adjustment triangle system. In connection with the present invention, the term "adjustment triangle system" is generally understood to mean an adjustment system which adjusts the light module with respect to the support frame via three adjustment elements (for example, adjustment screws) which are connected at least rotatably to the corresponding light module and to the support frame. In this case, the adjustment normally takes place by means of mechanical and/or electromotive adjusting means which are associated with the illumination device.

The terms "vertical" and "horizontal" here refer to an illumination device installed in a motor vehicle headlight, the motor vehicle headlight being properly installed in a motor vehicle.

Figure 4:
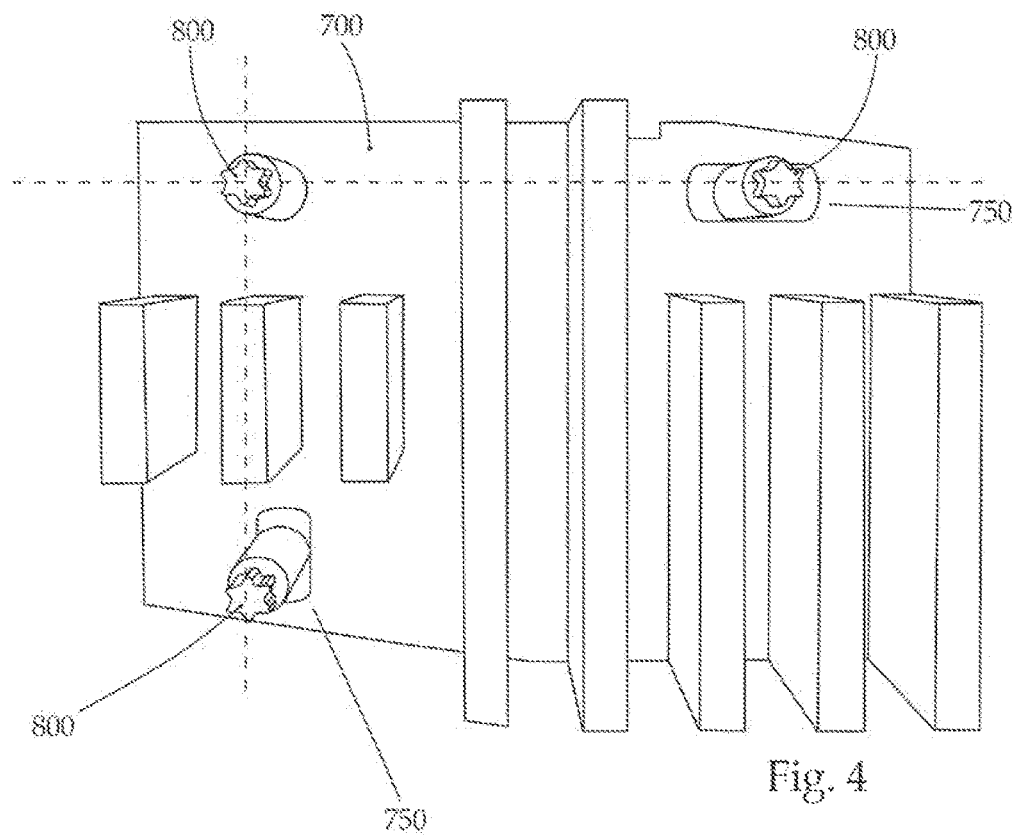

FIG. 4 shows a further rear view of an exemplary illumination device, wherein the screw section of an adjustment screw 800 engages in a vertically formed slot 750 and the screw section of another adjustment screw 800 engages in a horizontally formed slot 750. This allows for a further freedom of adjustment when adjusting the light module. If such slots 750 are not present, the screw heads of the adjustment screws can jam during adjustment or experience an unnecessarily high mechanical load. The slots 750 thus serve as an additional error compensation option during the adjustment of the light module.

LIST OF REFERENCE SYMBOLS

Illumination device . . . 10
Light module . . . 100
Light source . . . 110
Primary Optics . . . 200
Heat sink . . . 300
Holding body . . . 400
Fastening means . . . 500
Support frame . . . 700
Counter-threaded element . . . 710
Counter-thread . . . 720
Slot . . . 750
Adjustment screw . . . 800
Screw head . . . 810
Threaded section . . . 820
Thread . . . 830
Bearing device . . . 900
First bearing shell . . . 910
Second bearing shell . . . 920
Longitudinal axis . . . A

The invention claimed is:

1. An illumination device for a motor vehicle headlight, the illumination device (10) comprising:
- a light module (100) comprising:
  - at least one light source (110),
  - a primary optics (200) for shaping a light distribution from the light of the at least one light source (110),
  - a heat sink (300) in thermal contact with the at least one light source (110) and set up to dissipate heat from the at least one light source (110), and
  - a holding body (400) set up to hold the primary optics (200) in their position in relation to the at least one light source (110), the holding body (400) and the heat sink (300) being connected to one another by means of at least one fastening means (500); and
- a support frame (700) to which the light module (100) is fastened via at least one adjustment screw (800), the adjustment screw (800) comprising a screw head (810) and a screw section along a longitudinal axis (A), which screw head (810) is mounted in an articulated manner on the light module (100) and which screw section acts on the support frame (400),
- wherein the light module (100) comprises at least one bearing device (900) for the articulated mounting of the screw head (810) of the at least one adjustment screw (800), which bearing device (900) comprises a first and a second bearing shell (910, 920), wherein the first and the second bearing shell (910, 920) form a joint socket by bringing together the two bearing shells, wherein the first bearing shell (910) is arranged on the holding body (400) and produced in one piece therewith and the second bearing shell (920) is arranged on the heat sink (300) and produced in one piece therewith, and wherein the bearing device (900) is set up to support the screw head (810) of the at least one adjustment screw (800), and wherein the joint socket of the screw head (810) encloses the at least one adjustment screw (800) such that the at least one adjustment screw (800) is secured against displacement in the direction of its longitudinal axis (A), wherein the screw head (810) of the at least one adjustment screw (800) is rotatably mounted about the longitudinal axis (A) of the adjustment screw (800) in the at least one bearing device (900), so that the adjustment screw (800) and the corresponding bearing device (900) form a so-called ball joint.

2. The illumination device according to claim 1, wherein the at least one adjustment screw (800) comprises a threaded section (820) having a thread (830) and the support frame (700) comprises at least one counter-threaded element (710), which at least one counter-threaded element (710) has a counter-thread (720) corresponding to the thread (830) of the at least one adjustment screw (800).

3. The illumination device according to claim 1, wherein the light module (100) comprises at least two bearing devices (900), wherein the illumination device (10) has a number of corresponding adjustment screws (800) corresponding to the number of bearing devices (900).

4. The illumination device according to claim 3, wherein the light module (100) comprises exactly three bearing devices (900), wherein the illumination device (10) comprises at least three adjustment screws (800) corresponding to the corresponding bearing devices (900).

5. The illumination device according to claim 4, wherein the counter-threaded elements (710) of the support frame (700) corresponding to the adjustment screws (800) are arranged on the support frame (700) such that imaginary connecting lines among the counter-threaded elements (710) form a right-angled triangle.

6. The illumination device according to claim 3, wherein the longitudinal axes (A) of the adjustment screws (800) are arranged parallel to one another when the adjustment screws (800) are at least partially screwed in on the support frame (700).

7. The illumination device according to claim 1, wherein the screw head (810) of the at least one adjustment screw (800) is designed as a joint head or as a ball head.

8. A motor vehicle headlight having at least one illumination device (10) according to claim 1.

9. The illumination device according to claim 5, wherein the right-angled triangle is an isosceles right-angled triangle.

* * * * *